United States Patent [19]

Evanitsky

[11] 4,305,653

[45] Dec. 15, 1981

[54] SCANNING DIAGNOSTICS

[75] Inventor: Eugene S. Evanitsky, Pittsford, N.Y.

[73] Assignee: Xerox Corporation, Stamford, Conn.

[21] Appl. No.: 81,230

[22] Filed: Oct. 2, 1979

[51] Int. Cl.[3] .................... G03G 15/28; G03G 15/32
[52] U.S. Cl. ..................................... 355/8; 355/14 R
[58] Field of Search ............. 355/3 R, 8, 14 R, 14 E; 371/29

[56] References Cited

U.S. PATENT DOCUMENTS 4,118,117  10/1978  Koizumi et al. ....................... 355/8
4,159,173   6/1979  Kasuga ........................... 355/14 R X
4,162,396   7/1979  Howard et al. ................... 371/29 X Primary Examiner—Fred L. Braun Attorney, Agent, or Firm—Ronald F. Chapuran

[57] ABSTRACT

The time periods between energization of an optics clutch and activation of a scan switch at the end of scan position and between de-energization of the optics clutch and actuation of the scan switch at the home position are provided. Representations of the time periods are continuously displayed during a copy run. The last timing periods of a copy run are temporarily stored until the next copy run. Upon entering a diagnostic mode, the machine will produce a copy in the normal manner and display a number corresponding to the forward scan and return scan or flyback time periods. Through suitable conversion, the scan time in milliseconds can be provided.

11 Claims, 4 Drawing Figures

SCANNING DIAGNOSTICS

The present invention relates to a reproduction machine having an optical scanning system and more particularly, to optical scanning and timing diagnostics.

Servicing and repairing reproduction machines can be time consuming and expensive. Various diagnostic features have been provided in prior art reproduction machines to minimize servicing and repair. For example, U.S. Pat. No. 4,156,133, assigned to the same asignee as the present invention, describes an invention for displaying sheet travel times between sensors in a paper path. The times are stored in memory and can be selectively accessed. U.S. Pat. No. 3,880,516, also assigned to the same asignee as the present invention, teaches the use of a diagnostic device to be interconnected to a reproduction machine to convert the copy counter into a pulse timing mechanism to determine if machine events occur during proper time intervals. These systems, however, are flash exposure systems and do not apply to an optical scanning system. They also generally pertain to complex reproduction machines and are part of sophisticated control systems that are relatively expensive.

Other prior art systems use sensors to synchronize and machine control operation. For example, U.S. Pat. No. 3,744,900 teaches the use of a synchronizer system in which an electronic flash exposure is initiated in response to the position of a movable photosensitive surface and in response to the position of a paper feed device. Other systems such as shown in U.S. Pat. No. 4,003,569 use paper path sensors at exit locations to achieve minimum elapse time between successive multiple copy runs and U.S. Pat. No. 3,734,604 teaches the use of failsafe detectors. These systems, however, do not provide for diagnostic response.

Many reproduction machines use an optical scanning system to project an image of a document onto a photoreceptor. The systems use scanning carriages supporting the optical components to scan the document. The carriages scan from a home to end of scan position and then are returned from end of scan to the home position to start a new scan. The timing of the machine is provided by suitable switches activated by the motion of the scan carriages. Forward motion is often provided, for example, by a chain and pulley arrangement and return motion provided by a suitable spring. Degradation and wear of mechanical components can lead to improper scanning motion as well as improper timing. For example, variations in components, such as spring tension, or variations in the positions of the switches, or foreign contaminents affecting movement of the carriages can affect the time period of the scanning cycle. This can adversely affect the timing and the operation of the machine.

It would be desirable, therefore, to provide a diagnostic system that is relatively inexpensive and suitable for adjusting and correcting operation or preventing malfunctions in an optical scanning system.

It is therefore an object of the present invention to provide a new and improved optical scanning diagnostic system that is economical and can provide suitable timing and component malfunction information to optimize machine operation. Further objects and advantages of the present invention will become apparent as the following description proceeds and the features characterizing the invention will be pointed out with particularity in the claims annexed to and forming a part of this specification.

Briefly, the present invention is concerned with the time period between energization of an optics clutch and activation of a scan switch at the end of scan position and also the time period between de-energization of the optics clutch and actuation of the scan switch at the home position. Representations of the time periods are continuously displayed during a copy run. The last timing periods of a copy run are temporarily stored until the next copy run. Upon entering a diagnostic mode, the machine will produce a copy in the normal manner but display a number corresponding to the forward scan and return scan or flyback time periods. Through suitable conversion, the scan time in milliseconds can be provided.

For a better understanding of the present invention reference may be had to the accompanying drawings wherein the same reference numerals have been applied to like parts and wherein.

DESCRIPTION OF THE INVENTION

Figure 1:
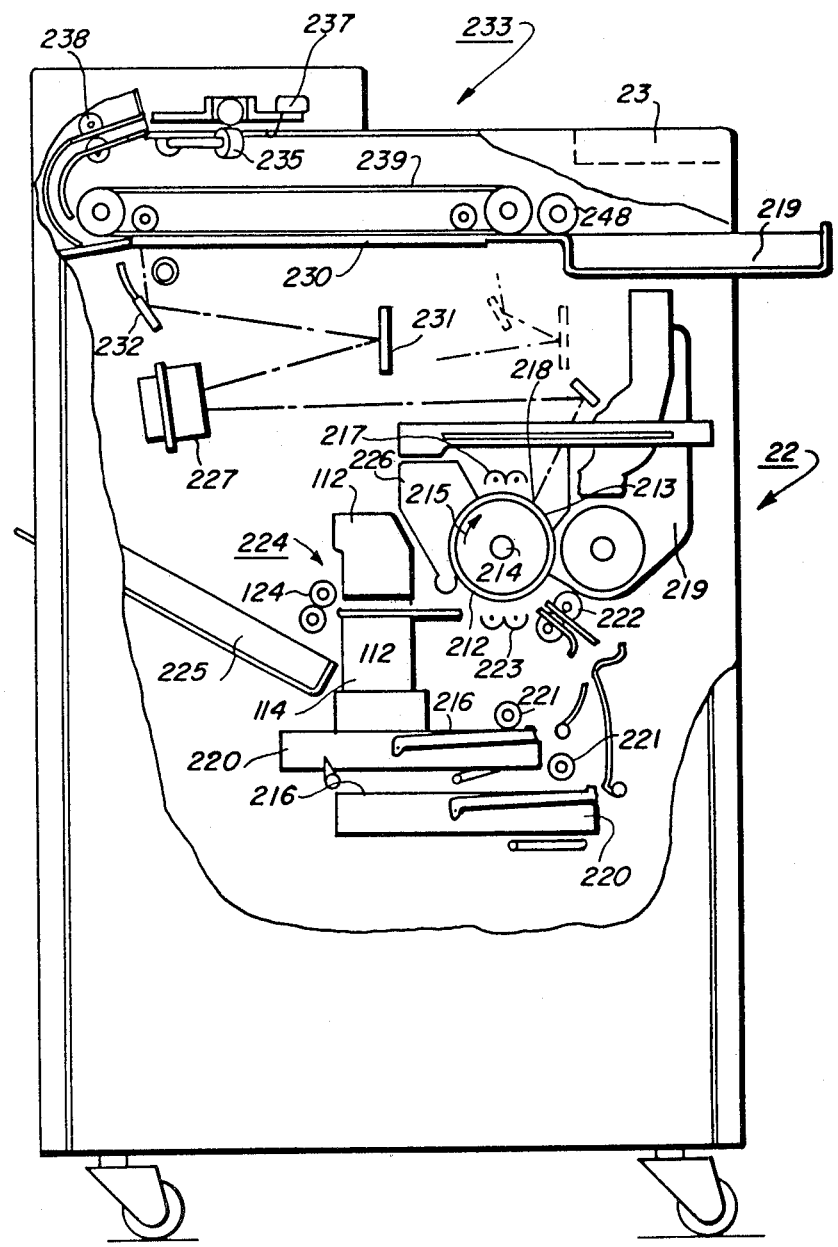
FIG. 1 is a representation of a reproducing apparatus incorporating the present invention.
Figure 2:
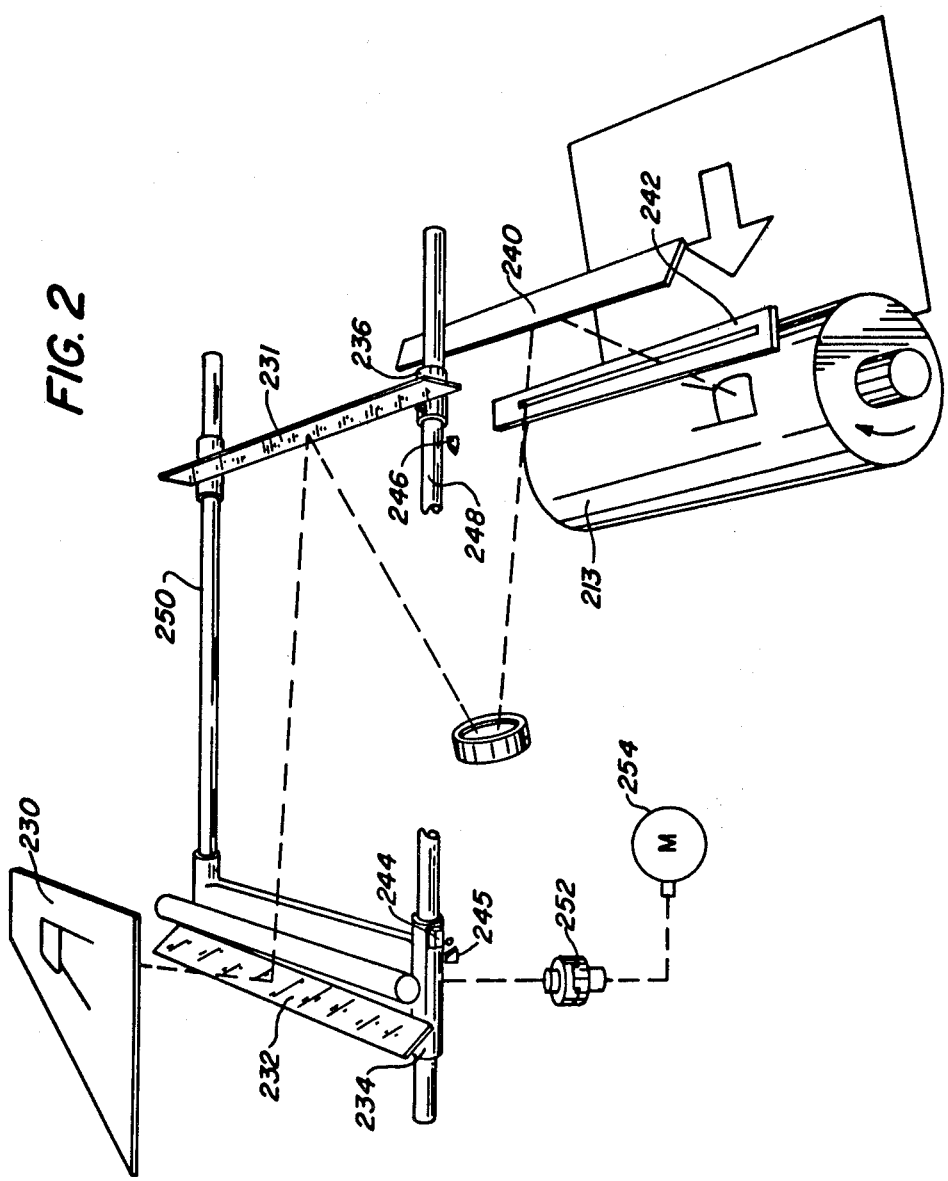
FIG. 2 is a more detailed representation of the scanning and optics system of the apparatus of FIG. 1.
Figure 3:
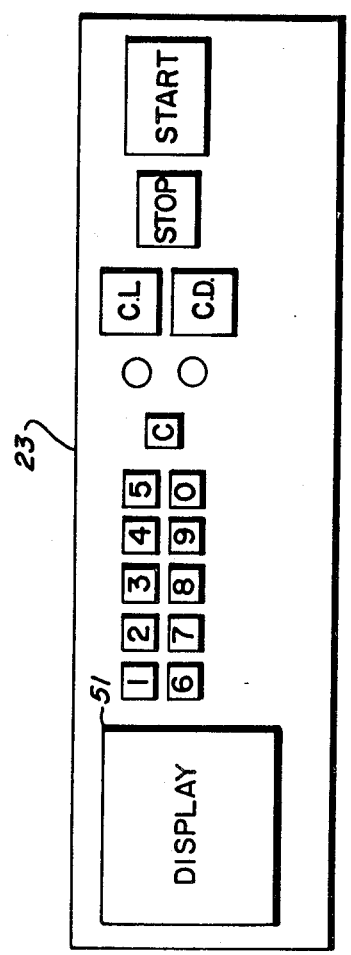
FIG. 3 illustrates the control panel in accordance with the present invention.

Referring now to FIGS. 1, 2 and 3, there is shown by way of example an automatic xerographic reproducing machine 22 including a control console 23 and an image recording drum-like member 212, its outer periphery coated with a suitable photoconductive material or surface 213. The drum 212 is suitably journaled for rotation within a machine frame (not shown) by means of shaft 214 and rotates in the direction indicated by arrow 215 to bring the image-bearing surface 213 thereon past a plurality of xerographic processing stations. Suitable drive means (not shown) are provided to power and coordinate the motion of the various cooperating machine components whereby a faithful reproduction of the original input scene information is recorded upon a sheet of final support material or copy sheet 216.

Initially, the drum 212 moves the photoconductive surface 213 through a charging station 217 providing an electrostatic charge uniformly over the photoconductive surface 213 in known manner preparatory to imaging. Thereafter, the drum 212 is rotated to exposure station 218 and the charged photoconductive surface 213 is exposed to a light image of the original document to be reproduced. The charge is selectively dissipated in the light exposed regions to record the original document in the form of an electrostatic latent image. After exposure drum 212 rotates the electrostatic latent image recorded on the photoconductive surface 213 to development station 219 wherein a conventional developer mix is applied to the photoconductive surface 213 of the drum 212 rendering the latent image visible. Typically a suitable development station could include a magnetic brush development system utilizing a magnetizable developer mix having coarse ferromagnetic carrier granules and toner colorant particles.

Sheets 216 of the final support material are supported in a stack arrangement on an elevating stack support tray 220. With the stack at its elevated position a sheet separator 221 feeds individual sheets therefrom to the registration system 222. The sheet is then forwarded to the transfer station 223 in proper registration with the image on the drum. The developed image on the photoconductive surface 213 is brought into contact with the sheet 216 of final support material within the transfer station 223 and the toner image is transferred from the photoconductive surface 213 to the contacting side of the final support sheet 216. Following transfer of the image the final support material is transported through a detack station where a detack corotron uniformly charges the support material to separate it from the drum 212.

After the toner image image has been transferred to the copy of final support material or copy sheet 216, the copy sheet 216 with the image is advanced to a suitable fusing station 224 for coalescing the transferred powder image to the support material. After the fusing process, the copy sheet 216 is advanced to a suitable output device such as tray 225.

Although a preponderance of toner powder is transferred to the copy sheet 216, invariably some residual toner remains on the photoconductive surface 213. The residual toner particles remaining on the photoconductive surface 213 after the transfer operation are removed from the drum 212 as it moves through a cleaning station 226. The toner particles may be mechanically cleaned from the photoconductive surface 213 by any conventional means, as for example, by the use of a cleaning blade.

Normally, when the copier is operated in a conventional mode, the original document to be reproduced is placed image side down upon a horizontal transparent platen 230 and the stationary original then scanned by means of a moving optical system. The scanning system includes a stationary lens 227 and a pair of cooperating movable scanning mirrors, half rate mirror 231 and full rate mirror 232 supported upon carriages not illustrated.

A document handler 233 is also provided including registration assist roll 235 and switch 237. When a document is inserted, switch 237 activates registration assist roll 235 and the document is fed forward and aligned against a rear edge guide of the document handler 233. The pinch rolls 238 are activated to feed a document around 180° curved guides onto the platen 230 for copying. The document is driven by a platen belt transport including platen belt 239. After copying, the platen belt 239 is activated and the document is driven off the platen by the output pinch roll 248 into the document catch tray 249.

Once the document is in position for copying, the scanning optical system is activated and the document is scanned by full rate mirror 232 and half rate mirror 231. At the end of scan, the full rate mirror 232 and the half rate mirror 231 are in the positions shown in phantom in FIG. 1. The full rate mirror 232 supported on a full rate carriage 234 as seen in FIG. 2, reflects the document image from the platen 230 to the half rate mirror 231. The half rate mirror 231 supported on a half rate carriage 236 reflects the image from the full rate mirror 232 to the lens 221 and the image is then projected to the image mirror 240 to reflect a focused image from the lens 227 onto the drum surface 213 through aperture plate 242. A scan drive clutch 252 transmits mechanical power from a main drive motor 254 through suitable (not shown) drive shaft and pulleys to the full rate and half rate carriages to drive the carriages along rails 248,250.

A scan switch illustrated at 244 is located on the full rate carriage 234 and provides suitable timing signals. If the scan switch is not actuated at the proper time, a jam or abnormal condition will be sensed. In operation, approximately one-half second after start print, a scan drive clutch signal is provided to the scan drive clutch 252 to drive the scan drive shaft via motor 254. The rotation of the scan shaft drives the scan drive pulleys and driving motion in turn is transmitted to the carriages 234, 236 assemblies via (not shown) scan drive cables. It should be noted that other suitable mechanical drives can be provided.

In operation, with the scan drive clutch energized, the scan drive shaft is rotated and the rotation winds up the scan cables onto the scan drive pulleys causing the scan carriages to move from left to right. As the carriages are driven, rotation of the scan drive shaft winds a (not shown) return spring. When the full rate carriage 234 reaches the scan end position, the scan switch is actuated by an end of scan ramp 246 on rail 248. The scan drive clutch will then de-energize and cause the return spring, at this point fully wound, to unwind rapidly causing the scan drive shaft to rotate in a reverse direction. This rotation winds up the scan cables on the scan drive pulleys in the opposite direction causing the carriages 234, 236 to be moved to the left or scan home position. At the scan home position, the scan switch 244 is activated by ramp 245 to provide an end of flyback signal.

If the return spring is too loose, the full rate carriage may never reach the scan home position, thus never actuating the scan switch 244. If the return spring is too tight, the full rate carriage may be driven into the left frame causing irreparable damage or misalignment to the optical components mounted on the carriages. The activation of the scan switch 244 by the beginning of scan ramp 245 and the end of scan ramp 246 on rail 248 provides signals to microprocessor 12 to be able to determine the time period between switch 244 activation by ramps 245 and 246 in both the forward scan direction and the reverse or flyback scan direction.

The scan switch signals generated by the home ramp and the end of scan ramp as well as the drive clutch 252 energization and de-energization signals provide the mechanical synchronization of the machine to the controls. Variations in mechanical components such as spring tension, position of the switch, or foreign contaminants affecting movement of the carriages can effect the time period between activation of the scan switch 244 at home position and end of scan position. Variations in the time period between these signals therefore can effect operation of the machine.

In accordance with the present invention, the time period between drive clutch 252 energization and the scan switch 244 activation at the end of scan position and the time period between drive clutch 252 de-energization and the scan switch 244 activation from the end of scan position to the home position (flyback time) are continuously displayed. The last timing periods of a copy run are temporarily stored until the next copy run. This information in the diagnostic mode can also be displayed. Upon entering the diagnostic mode preferably by grounding a specific input line, the tech rep will dial in copies and initiate start print. The machine will make a copy in the normal manner but will display a number corresponding to the forward scan and flyback time periods. The displayed number is a hexadecimal number and through suitable conversion, the scan time in milliseconds can be provided.

With reference to FIG. 3, the control panel 23 includes a keyboard with a two digit display 51, a start switch, a stop switch, copy lighter switch with indicator lamp, and copy darker switch with indicator lamp. The control panel switches and indicators are suitably connected to the microprocessor 12.

The control panel switches are membrane switches depending upon pressure for conduction. The control panel consists of layers of different material bonded together and pressing a switch brings a conductive area on the back of an overlay through a spacer to a printed circuit board completing the circuit associated with that particular switch.

Figure 4:
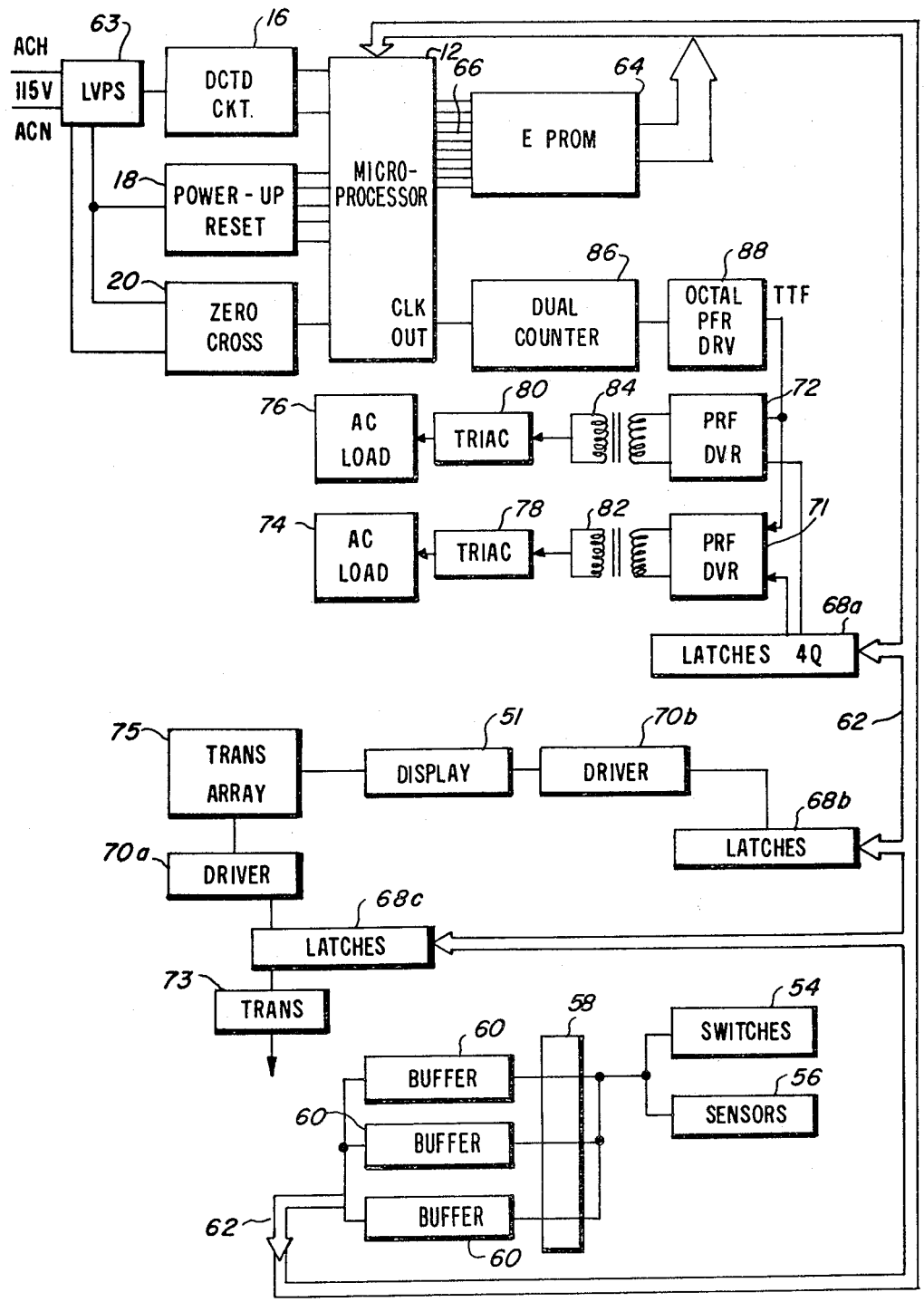
FIG. 4 is a schematic diagram of the details of the controller.

With reference to FIG. 4, there is shown a controller generally indicated at 10 including a bidirectional bus 62, microprocessor 12, dedicated circuitry 16, power up reset circuitry 18, and zero cross-over circuitry 20 for controlling a reproduction machine. Preferably, the microprocessor 12 includes a 2K by 8 read only memory ROM, an address stack, a 64 by 7 random access memroy RAM, an 8 bit arithmetic logic unit ALU, a control, a clock counter, a programmable timer, an interrupt control, an 8 bit input-output port, and an analog to digital converter ADC interconnected to a common internal bus. The bi-directional bus 62 interconnects the microprocessor 12 and host machine 22 and generally conveys signals from sensors 56 and switches 54 of the machine 22 to microprocessor 12 and conveys control signals from microprocessor 12 to the machine 22 via suitable drivers. For a more detailed discussion of microprocessor 12, reference is made to Docket No. D/78040, U.S. Ser. No. 80,624 filed Oct. 1, 1979, incorporated herein.

The signals of various reproduction machine switches 54 and sensors 56 are conveyed through a resistance network 58 and suitable buffers 60 to an 8 bit external data bus 62 connected to microprocessor 12. Typically, the resistance network 58 is any standard dual inline package configuration of thick film elements baked onto a ceramic substrate, terminated with wire leads and providing resistance in the range of 22 ohms to 220 Kohms. Buffers 60 are preferably octal buffers and line drivers with three state outputs. The 8 bit data bus 62 is also connected to a suitable memory device such as EPROM 64 interconnected to microprocessor 12 through suitable address lines 66. It should be noted that the EPROM device 64 can be replaced by a suitable read only memory internal to the microprocessor 12.

Outputs to the reproduction machine controlled elements are conveyed from the microprocessor 12 along the external data bus 62 to various latches 68a, 68b and 68c. The latches are preferably Schotky TTL octal d-type flip-flop and are interconnected to various drivers 70a, 70b, 71 and 72 or transistors 73 to activate various clutches, solenoids, motor drivers, triacs and power supplies in machine 22. Typical drivers 70a and 70b are high voltage, high current Darlington transistor arrays with high breakdown voltage and internal suppression diodes. Preferably, drivers 71 and 72 are peripheral NAND gates. In particular, the display 51 is interconnected to transistor array 75 and driver 70b.

Included are the code listings for the scan forward and flyback procedures. In the diagnostic mode, the information available at the display 51 is in hexadecimal. To convert the hexadecimal number to the appropriate scan time in milliseconds, it is necessary to multiply the tens digit (decimal value) by 16 and add the units digit (decimal value) and multiply the total by 20 as shown below.

"Hex" Conversion

| "Hex" | Decimal | |
|---|---|---|
| 0 | 0 | |
| 1 | 1 | |
| 2 | 2 | Timing information conversion - |
| 3 | 3 | multiply 10's digit (decimal |
| 4 | 4 | value) by 16, then add the units |
| 5 | 5 | digit (decimal value), then |
| 6 | 6 | multiply total by 20. The |
| 7 | 7 | resultant time will be in |
| 8 | 8 | milliseconds. |
| 9 | 9 | |
| A | 10 | Examples: |
| < | 11 | |
| C | 12 | 1 - "C3"  "c" converted to decimal |
| d | 13 | |
| E | 14 | $16 \times 12 = 192$  10's digit |
| F | 15 | $+\underline{\phantom{0}3}$  units digit |
| 10 | 16 | $\overline{195} \times 20 = 3900$ ms |
| 11 | 17 | |

2 - "Ad"
$16 \times 10 = 160$
$+\underline{\phantom{0}13}$
$\overline{173} \times 20 = 3860$ ms

TABLE I

Scan and Flyback Conversion Table

Scan Time

| Time (ms) | Hex Code |
|---|---|
| 2100 | 69 |
| 2120 | 6A |
| 2140 | 6L* |
| 2160 | 6C |
| 2180 | 6d |
| 2200 | 6E |
| 2220 | 6F |
| 2240 (nominal) | 70 |
| 2260 | 71 |
| 2280 | 72 |
| 2300 | 73 |
| 2320 | 74 |
| 2340 | 75 |
| 2360 | 76 |
| 2380 | 77 |
| 2400 | 78 |

Fault Beyond This Point

Flyback Time

| Time (ms) | Hex Code |
|---|---|
| 200 | OA |
| 220 | OL* |
| 240 | OC |
| 260 | Od |
| 280 | OE |
| 300 | OF |
| 320 | 10 |
| 340 | 11 |
| 360 | 12 |
| 380 | 13 |
| 400 (nominal) | 14 |
| 420 | 15 |
| 440 | 16 |
| 460 | 17 |
| 480 | 18 |
| 500 | 19 |
| 520 | 1A |
| 540 | 1L* |
| 560 | 1C |
| 580 | 1d |
| 600 | 1E |
| 620 | 1F |
| 640 | 20 |

TABLE I-continued

| Scan and Flyback Conversion Table | |
|---|---|
| Scan Time | |
| 660 | 21 |
| 680 | 22 |
| 700 | 23 |
| 720 | 24 |
| 740 | 25 |
| 760 | 26 |
| 780 | 27 |
| 800 | 28 |
| 820 | 29 |
| 840 | 2A |
| 860 | 2L* |
| 880 | 2C |
| 900 | 2d |
| 920 | 2E |
| 940 | 2F |
| 960 | 30 |
| 980 | 31 |
| 1,000 | 32 |
| 1,020 | 33 |
| 1,040 | 34 |
| 1,060 | 35 |
| 1,080 | 36 |
| 1,100 | 37 |
| Fault Beyond This Point | |

Table I below sets forth a scan and flyback conversion table. This information is used by a service representative to diagnose and make appropriate changes and adjustments to the scanning system to minimize down time. It should be noted that the conversion table could also be provided in a suitable table look-up and the conversion could be done automatically.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed is:

1. In a reproduction machine having a scanning optics system, a diagnostic method comprising the steps of providing a signal at the start of scan of the scanning optics system in the forward direction
activating a switch at the end of scan, the switch providing an end of scan signal,
providing end of scan and beginning of scan signals, for scanning of the scanning optics system in the reverse direction,
storing signals representing the scan time in the forward and reverse direction, and
displaying the representations of the scan time in the forward and reverse directions.

2. The method of claim 1 including the step of converting the stored signals of scan time into milliseconds.

3. The method of claim 1 wherein the step of providing a start of scan signal includes the step of enabling a scan drive clutch.

4. The method of claim 1 including the step of entering a diagnostic mode to display a number corresponding to forward scan or reverse scan time periods.

5. The method of claim 4 including the step of repeating the scan time periods for each subsequent scan.

6. A reproduction machine having a plurality of components and a photoreceptor cooperable with one another to produce impressions on support material and including a scanning optics system comprising
a scanning carriage for scanning a document to be reproduced,
a signal provided at the beginning of scan, a signal provided at the end of scan, and
means to continuously display signals representing diagnostic scanning information.

7. The machine of claim 6 wherein a switch is located on the scanning carriage and activated by a ramp at the end of scan.

8. The machine of claim 6 including means to enter a diagnostic mode to display a number representative of the time period between beginning of scan and end of scan.

9. The machine of claim 8 including a display panel to display said number.

10. The machine of claim 6 including a switch mounted on the scanning carriage and a ramp secured to the machine to activate the switch.

11. The machine of claim 6 including the means to repeat said display signals.

* * * * *